Patented Mar. 6, 1951

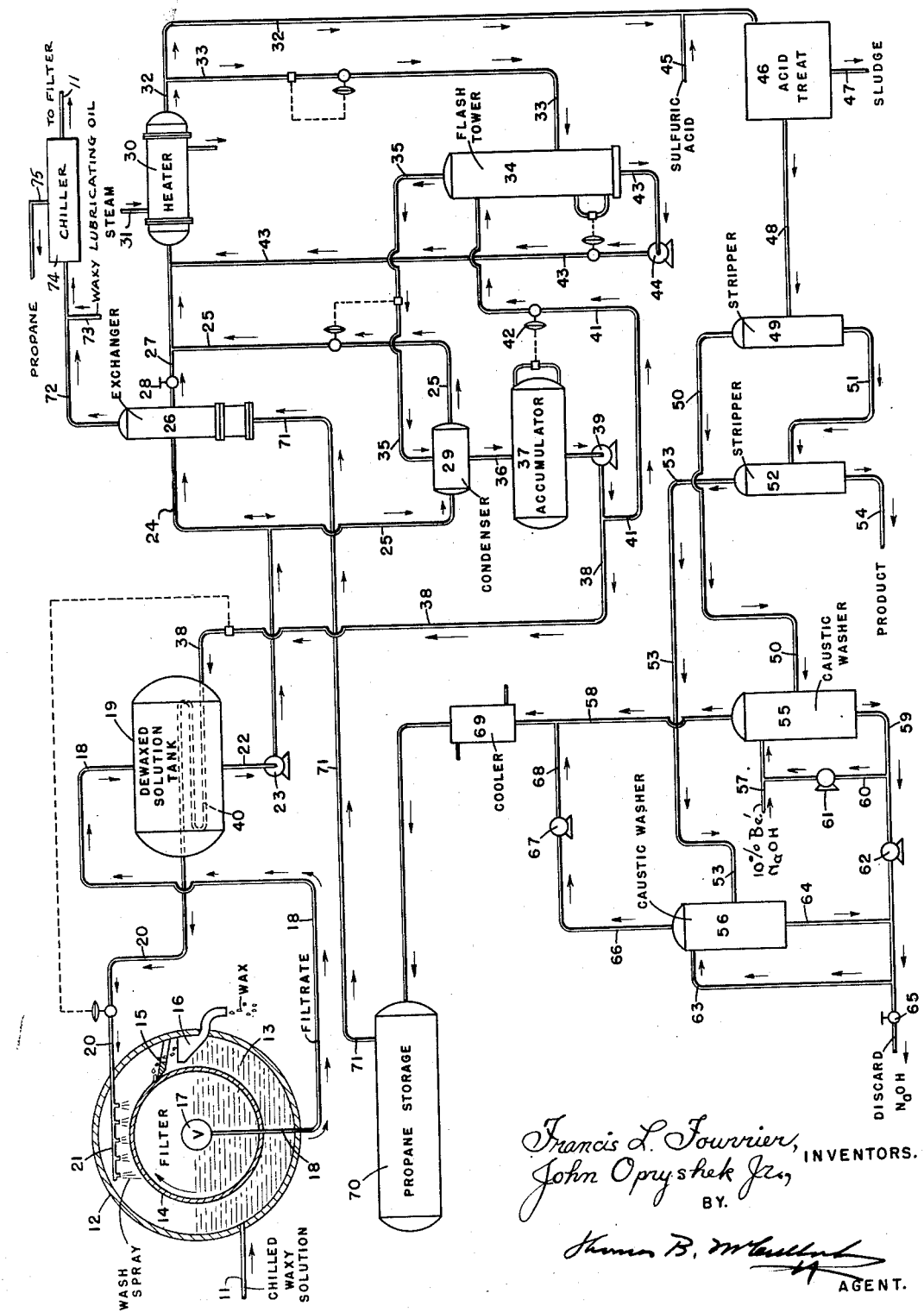

2,544,307

UNITED STATES PATENT OFFICE 2,544,307

METHOD FOR REMOVING OIL FROM FILTER CAKES

Francis Leo Fourrier and John Opryshek, Jr., Baytown, Tex., assignors, by mesne assignments, to Standard Oil Development Company, Elizabeth, N. J., a corporation of Delaware Application November 20, 1948, Serial No. 61,152

5 Claims. (Cl. 196—18)

The present invention is directed to a method for recovering oil from filter cakes. More particularly, the invention is directed to a dewaxing operation in which wax is filtered from a solution of hydrocarbons containing it and the wax is washed with a light hydrocarbon.

It is known that solutions of lubricating oil in light hydrocarbons such as propane, butane, pentane, and the like may be dewaxed by chilling the solutions containing the waxy lubricating oil fractions to a low temperature to cause formation of wax crystals following which the wax crystals are separated by filtration from the waxy solutions by rotary filters and the like. It is known also that the wax cake building up on the filters may be washed with a portion of the chilled diluent hydrocarbon to recover oil therefrom. Numerous modifications of these well known procedures have been suggested, among which has been involved the chilling of propane to remove foreign matter therefrom and distilling the chilled propane employed to wash the waxy filter cake to recover the oil. It is also known to treat with strong sulfuric acid, such as acid having a strength from about 85% to 100% $H_2SO_4$, lubricating oil fractions dissolved in light hydrocarbons such as propane, butane, pentanes, and the like. The presence of the light hydrocarbon reduces the viscosity of the lubricating oil and allows the sulfuric acid to contact the deleterious bodies in the lubricating oil more intimately than was possible in the absence of the light hydrocarbon.

When the systems of dewaxing and acid treating in light hydrocarbon solutions were combined, it was found that difficulty was attended in washing the waxy filter cake free of oil with the hydrocarbon diluent such as propane due to the fact that the propane became associated with water in a system including dewaxing and acid treating facilities. For example, the dewaxed oil in solution in the propane is contacted with sulfuric acid in the conventional operation and a sludge is formed which is separated. The dewaxed oil is then subjected to a series of stripping operations to remove the propane from the treated oil and the propane is then returned to propane storage for reuse in the process. However, this propane which has been recovered from the acid treated oil contains sulfur compounds which are picked up from the sulfuric acid. Therefore, it is necessary to wash this propane with an alkaline neutralizing solution such as a sodium hydroxide solution having a gravity of about 10° Bé. Such aqueous solutions of sodium hydroxide contacted with the propane recovered from the acid treated oil results in the propane becoming saturated with water under the conditions obtaining in the system. This propane, in view of its water content, cannot be used as a washing medium for the waxy filter cake since the presence of water in the propane at the low temperatures of washing results in the formation of ice crystals and hydrates of propane which plug the propane sprays, effectively preventing the cakes from being washed with the propane and resulting in the loss of valuable oil which is associated with the wax in the filter cake. To emphasize the importance of the amount of oil which has been lost, filter cakes which have not been washed with propane may contain as high as 33% by weight of valuable lubricating oil constituents.

It is, therefore, the main object of the present invention to provide a method for washing filter cakes in a process involving dewaxing and acid treating of lubricating oil fractions in which the propane comes in contact with an aqueous solution as it cycles in the system.

Another object of the present invention is to provide a method involving dewaxing and acid treating of lubricating oils in which the waxy filter cake is washed with dry light hydrocarbon to recover valuable oil constituents.

The objects of the present invention may be achieved by providing a process including dewaxing and acid treating steps in which the dewaxed solution containing propane is subjected to a simple flash distillation operation to remove a substantially dry propane therefrom which is then employed as a washing medium for the waxy filter cake.

Briefly then, the present invention may be described as involving dewaxing of a chilled waxy solution to remove wax therefrom and to form a filter cake, subjecting the dewaxed solution containing propane to a flash distillation operation to remove from the dewaxed solution substantially dry propane and employing the dry propane after suitable chilling as a washing medium for the waxy filter cake. The dewaxed solution still containing a large amount of propane is then subjected to acid treatment to remove deleterious bodies therefrom following which the propane is recovered from the acid treated oil, freed of sulfur compounds by washing with an alkaline solution, and is then employed to dilute a wax containing lubricating oil which is chilled to a wax crystallization temperature and employed as a feed to the filtration step. The propane as it contacts aqueous solutions of the alkaline neutralizing medium becomes substantially saturated with water which makes it unsuitable as a washing medium unless the water is removed by the flashing operation as has been described.

The invention will be further illustrated by reference to the drawing in which the single figure is in the form of a flow diagram of one mode of practicing our invention.

Referring now to the drawing, numeral 11 designates an inlet line through which a chilled waxy solution such as a lubricating oil dissolved in propane is introduced into the system. The chilled waxy solution flows through line 11 into a rotary filter 12 which may be a plurality of rotary filters, but for purposes of illustration is shown as a single rotary filter. The rotary filter 12 is filled with the waxy solution to the point indicated by the shaded portion 13. Encased in the filter shell 12 is the filter surface 14 which is suspended in the waxy solution 13 and contacts it continuously as the filter surface rotates in the solution. As the filter rotates in the solution there is built up on the filter surface a waxy cake which is removed from the surface of the filter by a knife 15 which causes the wax to fall into a hopper or conveyor 16 which removes it from the shell 12. The filtrate or dewaxed solution is removed from the filter 12 through a valve arrangement 17 located on the axis of the filter 12 and withdraws the filtrate or dewaxed solution from the interior of the filter 14. The filtrate is withdrawn by valve 17 to line 18 which discharges it into a dewaxed solution tank 19. The wax as it accumulates on the surface of filter 14 contains a substantial amount of valuable oil that may amount to as much as 33 to 35%. Therefore, it is necessary to wash this wax cake with a dry hydrocarbon such as dry propane. Conveniently, this dry propane may be introduced to wash the filter cake by line 20 which terminates in wash sprays 21 allowing the dry propane to be sprayed across the face of the filter surface as it completes the cycle out of the waxy solution in the shell 12. The dry propane in line 20 is obtained in a manner which will be described further.

The dewaxed solution in dewaxed solution tank 19 flows outwardly therefrom by line 22 and pump 23 from whence it is split into two streams flowing, respectively, through lines 24 and 25. The stream flowing through line 24 is discharged into a dewaxed solution cold propane exchanger 26 where it flows in heat interchange with cold propane as will be described further. The dewaxed solution flows outwardly from exchanger 26 by line 27 controlled by valve 28 where it is admixed with the material from line 25, this solution from line 25 having been employed to provide refrigeration in condenser 29 as will be described further. After providing refrigeration in condenser 29 the dewaxed solution in line 25 is then admixed with the dewaxed solution in line 27 and is discharged thereby into a dewaxed solution heater 30 to which steam may be introduced by line 31. The dewaxed solution after flowing through heater 30 flows outwardly therefrom by line 32 and is divided into two streams, a major portion of which flows through line 32 and a minor portion of which flows through line 33. It will be seen that the solution flowing through line 32 contains a substantial amount of propane which, due to the fact that it has been subjected to repeated chilling operations at low temperatures, is substantially free of water. Therefore, this propane in solution in the dewaxed oil is a good source for dry propane. In accordance with the present invention, this stream in line 33 may be discharged thereby into a flash distillation tower 34, sufficient heat having been supplied by dewaxed solution heater 30 to allow flashing of a portion of the propane in flash distillation tower 34 by reducing the pressure therein. Although sufficient heat is usually provided by dewaxed solution heater 30, auxiliary heating facilities, not shown, may be included in distillation tower 34. Regardless of the source of heat, sufficient heat is provided in tower 34 to remove a substantially water-free propane by line 35 which is condensed in condenser 29 by heat interchange with the stream flowing through line 25. The condensed propane then discharges by line 36 into an accumulator drum 37 from whence it is pumped by line 38 and pump 39 through coil 40 located in dewaxed solution tank 19. From thence the chilled propane in a dry condition flows through line 20 and sprays 21 to wash the filter cake on filter 14 as has been described. A portion of the dry propane in line 38 may be withdrawn by branch line 41 controlled by valve 42 to the top of distillation tower 34 to serve as reflux therein and to aid in the separation of the dry propane from the dewaxed oil.

The dewaxed oil from which a portion of the propane has been removed then is removed from the bottom of flash distillation tower 34 by line 43 containing pump 44 and is pumped thereby back into line 27 where it admixes with the dewaxed solution therein and flows through heater 30 as has been described.

The dewaxed solution in line 32 is then admixed with a sufficient amount of sulfuric acid, which is introduced from a source not shown, by line 45 and the admixture discharged into an acid treating vessel 46 which is of sufficient capacity to allow contact of the acid with the dewaxed solution and also to provide a residence time sufficient for settling of sludge therefrom. The acid sludge comprising resinous and asphaltic bodies and other deleterious materials contained in the lubricating oil in the dewaxed solution may be withdrawn from drum 46 by line 47 for further treatment for recovery of valuable sulfuric acid constituents therein and valuable oil constituents which may have been occluded with the sulfuric acid.

The acid treated oil still containing propane is discharged from drum 46 by line 48 into a first stripper 49 which may be provided with a heating means not shown to cause distillation therein of propane from the acid treated oil, the propane being removed by line 50 for further treatment as will be described while the acid treated oil from which a substantial amount of propane has been removed is withdrawn from stripper 49 by line 51 and discharged thereby into a final stripper 52 which also may be equipped with a heating means not shown for removal of residual propane not removed in stripper 49. The residual propane is removed from stripper 52 by line 53 for further treatment as will be described while the dewaxed and acid treated oil is discharged from the system by line 54.

The propane in lines 50 and 53, respectively, are then routed to drums 55 and 56, respectively, where it is contacted with an aqueous alkaline solution such as a solution of sodium hydroxide in water of about 10° Bé. gravity. The propane from line 50 is discharged into drum 55 while the propane in line 53 is discharged into drum 56. The propane introduced by line 50 into drum 55 is contacted countercurrently with a 10° Bé. sodium hydroxide solution introduced by line 57 from a source not shown which effectively removes sulfur bodies therefrom and the treated propane is withdrawn from drum 55 by line 58 to a storage vessel as will be described further. The sodium hydroxide solution in drum 55 is withdrawn by line 59 and may be divided into two streams. One stream is recirculated to drum 55 by line 60 and pump 61 while the other stream is circulated to drum 56 by line 59, pump 62 and branch line 63 where it contacts countercurrently the propane introduced by line 53. The caustic flowing downwardly in drum 56 discharges therefrom by line 64 into line 59 and is circulated in part by line 63 back to drum 56. A portion of the circulated alkaline solution may be withdrawn from the system by opening valve 65 in line 59 whereas makeup solution is introduced by line 57 as has been described.

The propane from drum 56 is withdrawn therefrom by line 66 and passes through a series of compressors illustrated by compressor 67 where it is compressed and then discharged back into line 58 by line 68 which connects thereto. The combined streams of propane from lines 58 and 68 flow through cooler 69 and are cooled and discharged into a propane storage vessel 70. Propane storage vessel 70 is provided with a line 71 which passes the propane in heat exchange with the dewaxed solution in heat exchanger 26 and from thence the propane flows through line 72 to a series of chilling steps. The propane in line 72 may, without further chilling, be admixed with a waxy lubricating oil fraction, in the proper ratio which is well known to the art, introduced by line 73 from a source not shown and the admixture of diluted waxy lubricating oil then discharged into a chiller 74 wherein the admixture may be chilled to a wax crystallization temperature and then discharged by line 11 into filter 12, as has been described. Chiller 74 may include a plurality of chilling tanks wherein chilling of the diluted lubricating oil solution may be effected by evaporating propane from the mixture, sufficient excess propane being added by line 72 to obtain the desired reduction in temperature and also to provide the requisite dilution ratio. When chilling is accomplished by auto-refrigeration the evaporated propane will be removed from chiller 74 by line 75 and discharged after liquefaction into propane storage tank 70. Chiller 74 if desired may include external chilling means and may comprise coils through which the diluted waxy lubricating oil flows.

It will be seen from the foregoing description taken with the drawing that the propane picks up substantial amounts of water in drums 55 and 56 in which it contacts the aqueous alkaline solution. The propane becomes saturated with water under the conditions obtaining in these drums and this water is carried over into propane storage vessel 70 and from thence to lines 71 and 72. Thus, the propane circulating in the system may contain a considerable amount of water which prevents its use as a washing medium.

It will also be seen from the foregoing description taken with the drawing that flash distillation tower 34 allows the provision of a substantially dry propane since any water which is picked up in drums 55 and 56 is removed in the chilling cycles which the propane and waxy solution undergo.

In order to illustrate the value of the invention further, cold clean dry propane which may be obtained as illustrated by the foregoing description taken with the drawing was flashed to −40° F. in one of the filter shells of a filter of a commercial propane dewaxing and acid treating plant and filtered to the cloudy compartment of the dewaxed solution tank and then charged at various rates to the sprays of another filter. The filter cake on this filter was washed with dry propane at a rate of 1000 barrels per day and 1,500 barrels per day. Without any wash the filter cake contained 33% oil. At 1000 barrels per day wash rate, the filter cake contained only 14% oil and at a wash rate of 1,500 barrels per day, the oil content of the wax had been reduced to 10% oil. On a unit having a charge rate of about 8,000 barrels per day the amount of oil which may be recovered may amount to 185 barrels per day. While numerically small, the amount of savings due to the value of the lubricating oil recovered from the wax cake after subtracting the costs of the increased requirements of sulfuric acid and other chemicals for the process of the present invention may total over $500,000 a year.

The lubricating oil treated in the practice of the present invention may be either a distillate lubricating oil fraction or it may be a residual lubricating oil fraction. When distillates are employed, it will be unnecessary to subject the distillates to a deasphalting operation before they are charged to the dewaxing operation, but when a residual fraction is employed, it must be deasphalted before it is employed in the practice of the present invention. Likewise, the invention has been described and illustrated by examples in which propane has been used as the light hydrocarbon in which the lubricating oil is dissolved and usually it will be preferred, but the invention has application to other light hydrocarbons such as butanes, pentanes, and the like. Propane may be used in admixture with butane and with ethane, but ordinarily substantially pure light hydrocarbon such as liquefied propane and liquefied butane will be used.

The conditions employed in the practice of the present invention may include temperature of the dewaxed solution of about −30° F. which, of course, the temperature of the chilled dry propane will approximate. The temperature of the oil leaving the dewaxed solution heater is approximately 46° F. while the temperature of the oil leaving the acid treating operation will be of the order of about 50° F. The propane as it flows through lines 58 and 68 will be at a temperature of the order of 120° F. which may be reduced to a temperature of about −25° F. as it flows through line 72 into the chilling steps not shown.

In a plane charging about 8,000 barrels per day of a residual fraction from crude petroleum, the dewaxed solution may amount to about 24,000 barrels per day, the acid treated oil routed to the stripper may amount to about 18,000 barrels per day, while the propane chilled to −25° F. and flowing to the filters as a washing medium may amount to about 6,000 barrels per day.

The nature and objects of the present invention having been fully described and illustrated, what we wish to claim as new and useful and to secure by Letters Patent is:

1. In a process in which a lubricating oil fraction is diluted with a normally gaseous light hydrocarbon, chilled, dewaxed to form a filter cake and a dewaxed solution, the dewaxed solution is subjected to contact with sulfuric acid, normally gaseous light hydrocarbon is removed from the acid treated oil, and the light hydrocarbon is contacted with an aqueous solution, the steps of separating a portion of said dewaxed solution prior to any contact thereof with sulfuric acid, distilling said separated portion of the dewaxed solution to recover a substantially dry light hydrocarbon therefrom, chilling said substantially dry light hydrocarbon, and washing said filter cake with said chilled dry light hydrocarbon.

2. A process in accordance with claim 1 in which the light hydrocarbon is propane.

3. A process for dewaxing a lubricating oil fraction which comprises diluting a lubricating oil fraction containing wax with liquefied propane which is substantially saturated with water, chilling the diluted lubricating oil fraction to a wax crystallization temperature, filtering said chilled diluted lubricating oil fraction to form a waxy filter cake and a substantially wax-free solution of propane and oil, separating said solution into two portions, distilling the first portion of said solution to obtain a substantially dry propane stream, washing said cake with said dry propane, contacting the second portion of said solution with strong sulfuric acid to form a sludge phase and an oil phase and separating said phases, distilling said oil phase to separate a sulphur contaminated propane stream therefrom, contacting said sulfur contaminated propane with an aqueous alkaline solution under conditions to saturate said propane with water, and employing said contacted water-saturated propane to dilute said lubricating oil fraction.

4. A process in accordance with claim 3 in which the lubricating oil fraction is a distillate fraction.

5. A process in accordance with claim 3 in which the lubricating oil fraction is a residual fraction.

FRANCIS LEO FOURRIER.
JOHN OPRYSHEK, Jr.

REFERENCES CITED

The following references are of record in the file of this patent:

UNITED STATES PATENTS

| Number | Name | Date |
|---|---|---|
| 2,098,007 | Mapes et al. | Nov. 2, 1937 |
| 2,218,516 | Bray | Oct. 22, 1940 |
| 2,443,532 | Berg | June 15, 1948 |